United States Patent [19]

Hayashi

[11] Patent Number: 5,527,857
[45] Date of Patent: Jun. 18, 1996

[54] ELECTROSTATIC INDUCTION PROOF ADHESIVE PRIMER

[75] Inventor: Kanji Hayashi, Tokyo, Japan

[73] Assignee: Altech Co., Ltd., Tokyo, Japan

[21] Appl. No.: 384,833

[22] Filed: Feb. 7, 1995

[30] Foreign Application Priority Data

Mar. 16, 1994 [JP] Japan .................................. 6-045898

[51] Int. Cl.⁶ .................................................. C08K 5/15
[52] U.S. Cl. .......................... 525/119; 525/116; 525/385; 525/328.2; 252/500
[58] Field of Search ..................... 526/292.2; 252/500; 525/328.2, 116, 119, 385

[56] References Cited

U.S. PATENT DOCUMENTS

| 4,255,553 | 3/1981 | Mizumura | 528/93 |
| 4,879,064 | 11/1989 | Adkins | 252/500 |
| 5,235,015 | 8/1993 | Ali et al. | 528/304 |
| 5,262,238 | 11/1993 | Trouve et al. | 428/402 |

*Primary Examiner*—Mark Nagumo
*Attorney, Agent, or Firm*—Flynn, Thiel, Boutell & Tanis

[57] ABSTRACT

An adhesive primer composed of a cross-linkable polymer exhibiting electrostatic induction proof properties, and a laminated film having such a primer layer. The laminated film represents a material capable of maintaining a high electrification preventative performance despite the fact that the base film itself constitutes the outer film surface.

2 Claims, No Drawings

ELECTROSTATIC INDUCTION PROOF ADHESIVE PRIMER

BACKGROUND OF THE INVENTION

1. Field of the Invention

This invention relates to a material which inhibits generation of electrostatic charges on an outer surface of a plastic film and which is effective in various fields plagued with electrostatic charges, such as the fields of packaging materials, information recording materials, construction materials, printing materials or electronic materials.

2. Description of the Prior Art

Plastic films or laminated products thereof, employed in a variety of technological fields, suffer from a drawback that electrostatic charges are induced on the films by contact or separation due to the dielectric properties of the plastics themselves. If electrostatic charges are induced on the plastic films or laminated products thereof, fine dust or dirt becomes affixed to the film surface, such that the films or laminated products are not usable as packaging material for food or pharmaceuticals. Besides, film feed or discharge characteristics at the time of printing on the plastic film are also deteriorated.

As an antistatic method for plastic film and laminated film, there have been proposed a method of neutralizing the charges by ionized air and a method consisting in mixing or coating an antistatic agent on the film resin. However, the neutralization method is in need of a dedicated device, while its effect is not durable. On the other hand, the method of mixing or coating the antistatic agent into or on the film resin leads to many hindrances because of the presence of the antistatic agent, foreign material to the film base material on the film surface. For example, if the composite film is used as a packaging material for food or pharmaceuticals, problems are raised in connection with toxicity of the antistatic agent, contamination of the food or pharmaceuticals and poor printability. Although attempts have been made for bonding a film comprising such an anti-static agent mixed into or coated on the film resin to another film, there has not been presented a method which fully obviates the above-mentioned prior-art problems.

If such a film is devised whose outer surface is the base film itself, and which exhibits electrostatic charge proof properties, this film represents an ideal material for the subsequent production process and practical application.

SUMMARY OF THE INVENTION

It is an object of the present invention to provide a material in which the outer film surface is the film itself and which is capable of maintaining high antistatic properties for a prolonged time.

The present inventor has found that the above object may be achieved by employing an adhesive primer comprising a specified cross-linkable polymer, and has arrived at the present invention.

Thus, the present invention provides (1) an adhesive primer comprising a cross-linkable polymer exhibiting electrostatic induction preventative properties;

(2) an adhesive primer as defined in (1) above, wherein the cross-linkable polymer is a cross-linkable copolymeric high molecular material having at least a carboxylic group and a quaternary ammonium base on its side chain;

(3) an electrostatic induction proof laminated film comprising a plastic film base and a primer layer formed of the adhesive primer as defined in (1) or (2) above;

and (4) an electrostatic induction proof laminated film comprising a plastic film base layer, a primer layer formed of the adhesive primer as defined in (1) or (2) above, an adhesive layer, and one or more of plastic film layers.

DETAILED DESCRIPTION OF THE INVENTION

According to the present invention, the cross-linkable polymer, as a constituent material for the adhesive primer layer, exhibiting electrostatic induction proof properties, contains functional groups which may be reacted with the base film or the adhesive for remarkably improving mechanical properties of the film, such as adhesivity or durability. In addition, electrification preventative properties may be imparted to the base film due to the electrostatic induction proof properties of the cross-linkable polymer.

The cross-linkable polymer having electrostatic induction proof properties according to the present invention is a polymer having cross-linkable functional groups and exhibiting dielectric polarization relaxation properties, such as a charged polymer having cationic groups present on a side polymer chain and a free anion, a charged polymer having anionic groups present on a side polymer chain and a free anion, or an intramolecular charged polymer having a cationic group and an anionic group present on a side polymer chain. A typical example is a cross-linkable copolymeric high molecular material having at least a carboxyl group and a quaternary ammonium base on its side chain.

The quaternary ammonium base in the cross-linkable copolymer has the effect of affording dielectric polarizability and quick dielectric polarization relaxation characteristics due to its electrical conductivity, while the carboxylic group and/or hydroxyl group have the effect of improving cross-linkability and have the effect of improving adhesive properties by being reacted with functional groups in the adhesive, such as isocyanate groups.

In order for the cross-linkable copolymer to function effectively as a primer, the copolymer is reacted with a polyfunctional monomer, as an element for cross-linking the primer layer, at the time of thermal pressure bonding with an adhesive layer, in order to give a copolymer which is used as a primer of the present invention.

The cross-linkable copolymer employed in the present invention may be produced by copolymerizing a monomer having the above-mentioned functional groups. Examples of the monomers include those having terminal —COOH groups, such as (meth)acrylic acid, acroyloxyethyl succinic acid, phthalic acid and (metha)hexahydrophthalic acid. Examples of monomers having quaternary ammonium bases include dimethylaminoethyl acrylate quaternary compounds, inclusive of anions, such as halides, sulfates, sulfonates or alkyl sulfonates as counter ions. Examples of monomers having hydroxyl groups include glycerin diglycidyl ether as a difunctional monomer, epoxy derivatives, such as trimethylolpropane triglycidyl ether, as a trifunctional monomer, and an ethyleneimine derivative, such as trimethylolpropane triazinyl ether. Monomers other than those given above may also be copolymerized. Examples of these other polymerizable monomers include alkyl (meth)acrylates, styrene and vinyl derivatives, such as vinyl acetate, halogenated vinyl or olefins.

As ring-opening reaction catalysts for the above-mentioned epoxy derivatives as the di- and trifunctional monomers, imidazole derivatives, such as 2-methyl imidazole, 2-ethyl imidazole or 4-methyl imidazole or epoxy ring-opening reaction catalysts for amines may be used as additives.

The composition of the component monomers of the primer of the present invention may be changed over a wide range of these monomers, the monomer having quaternary ammonium bases are preferably employed in an amount of 15 to 40 mol % based on the total monomers of the copolymer.

The proportion of the monomer having terminal —COOH groups preferably accounts for 3 to 13 mol % based on the total monomers. Monomers other than those given above are used in an amount of 63.5 to 79.5 mol % in order to make up the copolymer. If the monomer having quaternary ammonium bases is used in an amount of 15 mol % or less, only low static induction preventative effect is produced. Conversely, if the amount exceeds 40 mol %, the polymer is increased in hydrophilicity. On the other hand, the monomer having the hydroxy groups is preferably used in an amount of 0.5 to 1.5 mol % based on the total monomers.

There is no particular limitation to the plastic film base to which the adhesive primer layer of the present invention is applied and any film base employed in the relevant field may be employed. Examples of general-purpose or special-purpose plastic films, such as plastic film bases include polyesters, e.g. oriented or non-oriented polyethylene terephthalate (PET), polyolefins, such as polyethylene, polypropylene, linear low-density polyethylene (LLDPE), polyamides, polystyrene, polysulfone, polyvinyl chloride or ethylene-vinyl acetate copolymer, and laminated articles thereof. These may be blended with other high molecular materials or also contain suitable fillers, such as colorants.

The laminated film as the basic material exhibits the anti-static properties and tight bonding properties required of an anchor material for the adhesive and the film base. However, if thermal resistance or bonding strength needs to be augmented, depending upon the type of the film base or the laminating method employed, the above-mentioned di- or tri-functional epoxy monomers may be added or adjusted for increasing the cross-linking density.

These monomers are added in an amount of 2 to 15 wt. % based on the total cross-linkable copolymers. On the other hand, it suffices to add an epoxy cross-linking catalyst in an amount which may be calculated from the epoxy equivalent of the epoxy monomer to be added and the amine equivalent of the catalyst.

The primer thus adjusted is coated on the film base, and the resulting product is dried on heating. The dried product is then laminated and bonded to another film base using a dry laminating adhesive to produce a composite film. This composite film is peculiar in that it is free from friction, separation or induction of static charges, despite the fact that both outer surfaces of the film base exhibit the high surface resistivity of the base material. Also the composite film, if contacted with other plastic film surface, does not produce electrification due to friction on such other film surface. This holds true up to the thickness on the order of 0.5 mm of the contacted film. Thus the composite film represents a useful material which obviates once and for all the problems associated with the electrification preventative measures in connection with the laminated film by inhibiting the solution through the adsorption of the dust and dirt, inclusive of bacteria, floating in the vicinity of the outer surface of the film, without employing anti-static agents.

The electrification preventative properties of the composite laminated film ascribable to the primer of the present invention is based upon a function totally different from the phenomenon of dissipation of static charges due to the low surface resistance of the antistatic agent, as in the conventional practice, but is based upon the electrostatic charge induction proof function. That is, the intermediate adhesive primer layer for the laminated film, composed of the adhesive primer of the present invention, has a high dielectic constant and high electrical conductivity, and undergoes dielectric polarization by the static charges induced on the outer film surface. Since electrostatic plus and minus charge pairs of the intermediate adhesive primer layer undergoes inter-layer conduction neutralization, as a result of which static charges resulting from dielectric polarization disappear in an extremely short relaxation time. In addition, the lines of electrical force by the paired inter-layer charges are perpetually directed inward, while there are no electrical lines of force emanating from the outer film surface towards outside, such that electrostatic induction is not induced in a space surrounding the outer film surface. Consequently, there is no risk of inducing static charges on the surrounding small-sized dust particles or deposition of such dust particles on the outer film surface. Such phenomenon leads to the electrification preventative effect of the laminated film.

With the primer of the present invention, a laminated film base may be primer-treated in advance and the resulting film base may then be laminated and bonded to another film using a dry laminator. With a dry laminator having a primer coater annexed thereto, primer treatment and lamination may be carried out in succession. The present primer may be used in extrusion lamination in a similar manner to dry lamination.

The following wide range of application may be conceived of the laminated film with the adhesive primer according to the present invention.

Packaging materials, specifically, packaging materials for food and pharmaceuticals, in which deposition on the contents of surfuctants or the like used for prevention of electrification poses a problem, or in which a highly clean and sanitary environment is required.

Paper products; specifically, composite materials of paper and plastic films, above all, printable anti-static type film materials or combinations of paper, corrugated board and laminated films.

Printed products; specifically, plastic films processed for improving feed and discharge properties for offset printing.

Construction materials; specifically, plastic films used as walling or flooring materials or heat transfer printing films.

Advertisement and placard materials.

Adhesive tapes.

Liquid crystal and polarizing plates.

The primer of the present invention and the laminated film employing such primers will now be explained with reference to the following Examples and Comparative Examples.

EXAMPLE 1

A monomer mixture of MMA/EA/AA/DMAQ was copolymerized at a weight ratio of 50/10/5/35 in an isopropanol/water mixed solution (mixing ratio, 1:1) to produce a transparent solution having solid contents of 30%. In the above abbreviations, MMA, EA, AA and DMAQ denote methyl methacrylate, ethyl acrylate, acrylic acid and dimethyl aminoethyl methacrylate quaternary chloride, respectively.

To the above solution were added an epoxy monomer as a cross-linking agent in an amount of 10 wt. % based on the solid content of the solution, and 2-methyl imidazole as a catalyst in an amount of 5 wt. % based on the amount of the epoxy monomer, for preparing a solution in isopropanol having the solids concentration of 15%. This solution is referred to as a prepared solution 1.

EXAMPLE 2

A monomer mixture of BA/MMA/AA/DMAQ was copolymerized at a weight ratio of 45/15/5/75 in a mixed solution of isopropanol/water (mixing ratio, 1:1) to give a semi-transparent solution having a solid content of 30%. In the above, BA denotes butyl acrylate. To this solution were added an epoxy monomer as a cross-linking agent in an amount of 12 wt. % based on the solid content of the solution and 2-methyl imidazole in an amount of 5 wt. % based on the amount of epoxy. A solution in isopropanol having the solid concentration of 15% was prepared. This isopropanol solution is referred to herein as a prepared solution 2.

EXAMPLE 3

The prepared solution 1 was coated on a PET film 16 µm in thickness to a dry thickness of approximately 1 µm, and dried at 90° C. for 10 seconds. A plurality of these films were laminated with non-oriented polypropylene (CPP) films, each 50 µm in thickness, using an urethane-based adhesive for dry laminates (DIC-DRY LX–43+KM+75), to a dry adhesive thickness of 3 µm, at a laminating temperature of 60° C. and under curing conditions of 40° C. and 48 hours.

The laminated film thus prepared is referred to herein as laminated film 1.

EXAMPLE 4

The prepared solution 2 was coated on a PET film having a thickness of 16 µm under the same conditions as in Example 3 and dried. The resulting coated film was adhered to and laminated with another PET film, having a thickness of 16 µm, with the use of the adhesive of Example 3. The conditions of adhesion and lamination are the same as those for Example 3. The resulting laminated film is referred to herein as a laminated film 2.

COMPARATIVE EXAMPLE 1

A PET film 16 µm in thickness and a CPP film 50 µm in thickness were adhered and laminated to each other without using the primer of the present invention, under the same conditions as in Example 3, with the use only of the adhesive employed in Example 3.

The laminated film thus produced is referred to herein as laminated film 3.

COMPARATIVE EXAMPLE 2

A PET film 16 µm in thickness and another PET film 16 µm in thickness were adhered and laminated to each other without employing the primer of the present invention, under the same conditions as in Example 3, with the use only of the adhesive employed in Example 3. The resulting laminated film is referred to herein as a laminated film 4.

The laminated films 1 to 4 were evaluated as to the following measurement items. The results are shown in Table 1.

1) Surface resistance: measured with a high resistance measurement unit manufactured by MITSUBISHI YUKA KK under the trade name of "HI-RESTOR".

2) Amount of deposited charges: measured with a Faraday cage manufactured by SHISHIDO SHOKAI under the trade name of "STATIRON".

3) Ash deposition: A test piece 10 cm square was rubbed with a cloth 230 times back and forth and tobacco ash was placed close to it in order to observe the presence or absence of deposited ash at a height of 1 mm to the ash.

4) Adhesion strength:
(i) sample width, 15 mm;
(ii) exfoliation rate, 150 mm/min;
(iii) measurement device, Tensilon tension tester;
(iv) measurement environment, temperature of 20° C. and relative humidity of 50%;
(v) heatsealing, temperature of 190° C., heatsealing time of 2 seconds and heatsealing pressure of 3 kg/cm$^2$
(vi) heatsealing strength, 15 mm in width.

TABLE 1

| laminated films | 1 | 2 | 3 | 4 |
|---|---|---|---|---|
| Surface Resistance (Ω/m) | | | | |
| front side (log) | 13.3 | 14< | 13.3 | 13.7 |
| reverse side (log) | 13.3 | 14< | 13.3 | 13.7 |
| Charges [kV] | 0 | 0 | −1.5 to 2.0 | −4.5 to 6.2 |
| Ash Deposition | | | | |
| front side | o | o | x | x |
| reverse side | o | o | x | x |
| Adhesion Strength (g/15 mm) | PET/CPP 250 (PET fractured) | PET/CPP 255 (PET fractured) | PET/CPP 240 (PET fractured) | PET/CPP 240 (PET fractured) |
| Heatsealing Strength (kg/15 mm width) | 4 | — | 4 | — | ash deposited: o
no ash deposited: x

It is seen from above that, with the use of the adhesive primer exhibiting a high electrostatic induction proof performance, according to the present invention, it is possible for a plastic film to retain its electrification preventative performance for a prolonged time, despite the fact that the base film itself constitutes the outer surface of the plastic film.

What is claimed is:
1. An adhesive primer composition having electrostatic induction-proof properties, said composition comprising a cross-linkable polymer and an epoxy monomer as a cross-linking agent, said epoxy monomer having a solids content of from 10 to 20% and said cross-linkable polymer is a cross-linkable copolymeric high molecular weight material containing at least 3 to 13 mol % of a carboxylic group, based on the total monomers of the copolymer, and 15 to 30 mol % of a quaternary ammonium base, based on the total monomers of the copolymer.

2. The adhesive primer composition of claim 1, wherein said carboxylic group is provided by a compound selected from the group consisting of acrylic acid and methacrylic acid and said quaternary ammonium base is a dimethylaminoethyl acrylate quaternary ammonium compound.

* * * * *